(12) United States Patent
Tavlykaev et al.

(10) Patent No.: US 7,027,668 B2
(45) Date of Patent: Apr. 11, 2006

(54) OPTICAL MODULATORS WITH COPLANAR-WAVEGUIDE-TO-COPLANAR-STRIP ELECTRODE TRANSITIONS

(75) Inventors: Robert F. Tavlykaev, Ellicott City, MD (US); Ganesh K. Gopalakrishnan, Bethesda, MD (US); Scott T. Taylor, Woodstock, MD (US)

(73) Assignee: Covega Corporation, Jessup, MD (US)

( * ) Notice: Subject to any disclaimer, the term of this patent is extended or adjusted under 35 U.S.C. 154(b) by 325 days.

(21) Appl. No.: 10/427,982

(22) Filed: May 2, 2003

(65) Prior Publication Data

US 2003/0228081 A1    Dec. 11, 2003

Related U.S. Application Data

(60) Provisional application No. 60/376,871, filed on May 2, 2002.

(51) Int. Cl.
*G02B 6/26* (2006.01)
*G02B 6/10* (2006.01)
*G02F 1/035* (2006.01)
*G02F 1/295* (2006.01)

(52) U.S. Cl. ............... 385/2; 385/8; 385/41; 385/129; 359/246; 359/254; 359/322

(58) Field of Classification Search ............... 385/2–3, 385/8, 27, 39–41, 129–131; 359/238, 246, 359/254, 276, 322

See application file for complete search history.

(56) References Cited

U.S. PATENT DOCUMENTS 5,416,859 A    5/1995    Burns et al.

(Continued)

OTHER PUBLICATIONS

Shau-Gang Mao, Chieh-Tsao Hwang, Ruey-Beei Wu and Chun Hsiung Chen, Analysis of Coplanar Waveguide-to-Coplanar Stripline Transitions, IEEE Transactions On Microwave Theory And Techniques, Jan., 2000, vol. 48, No. 1.

(Continued)

*Primary Examiner*—Akm Enayet Ullah
*Assistant Examiner*—Jerry T. Rahll
(74) *Attorney, Agent, or Firm*—Jean C. Edwards, Esq.; Dickinson Wright, PLLC (57) ABSTRACT

The present invention relates to an optical modulator including an optical waveguide, and at least one CPW-to-CPS transition. The CPW segments include a hot electrode; and a ground plane disposed on each side of the hot electrode, and they share a ground plane. The CPS segment extends along an interaction length of the modulator. In one embodiment, two driving signals are applied so that the modulator operates as a dual-drive modulator. In another embodiment, a domain-inverted region is formed in a substrate of the dual-drive modulator to overlap with one arm of the optical waveguide (MZI) and invert a sign of a phase shift induced in that arm. Finally, a fixed chirp can be introduced into the dual-drive modulator by asymmetrically positioning the interferometer arms into gaps of the CPW segments with respect to the hot electrode, and by employing unequal width gaps in the CPW segments.

34 Claims, 5 Drawing Sheets

U.S. PATENT DOCUMENTS

| | | |
|---|---|---|
| 5,422,966 A | 6/1995 | Gopalakrishnan et al. |
| 5,563,965 A | 10/1996 | Madabhushi |
| 5,991,491 A | 11/1999 | Madabhushi |
| 6,016,198 A | 1/2000 | Burns et al. |
| 6,192,167 B1 | 2/2001 | Kissa et al. |
| 6,243,505 B1 | 6/2001 | Bosso et al. |
| 6,304,685 B1 | 10/2001 | Burns |
| 6,341,184 B1 | 1/2002 | Ho et al. |
| 6,504,640 B1 * | 1/2003 | Gopalakrishnan ............ 359/245 |

OTHER PUBLICATIONS

Hiroyo Ogawa and Akira Minagawa, Uniplanar MIC Balanced Multiplier-A Proposed New Structure for MIC's, IEEE Transactions On Microwave Theory And Techniques, Dec. 1987, vol. MTT-35, No. 12.

* cited by examiner

OPTICAL MODULATORS WITH COPLANAR-WAVEGUIDE-TO-COPLANAR-STRIP ELECTRODE TRANSITIONS

This relies on U.S. provisional application 60/376,871, filed on May 2, 2002 for priority.

The present invention relates to the use of coplanar-waveguide (CPW) to coplanar-strip (CPS) electrode transitions to improve the optical modulation efficiency of guided-wave modulators, and thus, to lower the radio frequency (RF) power levels required to drive them. The CPW-to-CPS electrode transitions also ensure that there is no spurious coupling into higher-order parasitic modes in the modulator chip, thus enhancing the operating bandwidth of the device. Furthermore, the use of CPS sections in the electrode increases its impedance and thereby lowers microwave reflection.

BACKGROUND OF THE INVENTION

Compared to their bulk counterparts, guided-wave electro-optic modulators offer a drastic reduction in the required driving power combined with a bandwidth extending into the 40 GHz band. A variety of electro-optic materials have been studied with a view towards their use for mass-production of modulators. Ferroelectric crystals, such as lithium niobate and the like, are the materials of choice for the vast majority of practical applications on account of their excellent electro-optic optic properties, high optical quality, and availability in large-size wafers from multiple vendors and at a reasonable cost. Of the multitude of guided-wave modulators proposed and developed thus far, traveling-wave modulators are the preferred choice over lumped-electrode modulators, especially at high frequencies.

A conventional traveling wave modulator 100 will now be described, with respect to FIG. 1. The traveling-wave modulator 100 of FIG. 1 consists of an optical waveguide structure formed in an electro-optic chip, and a traveling-wave electrode structure.

Figure 1:
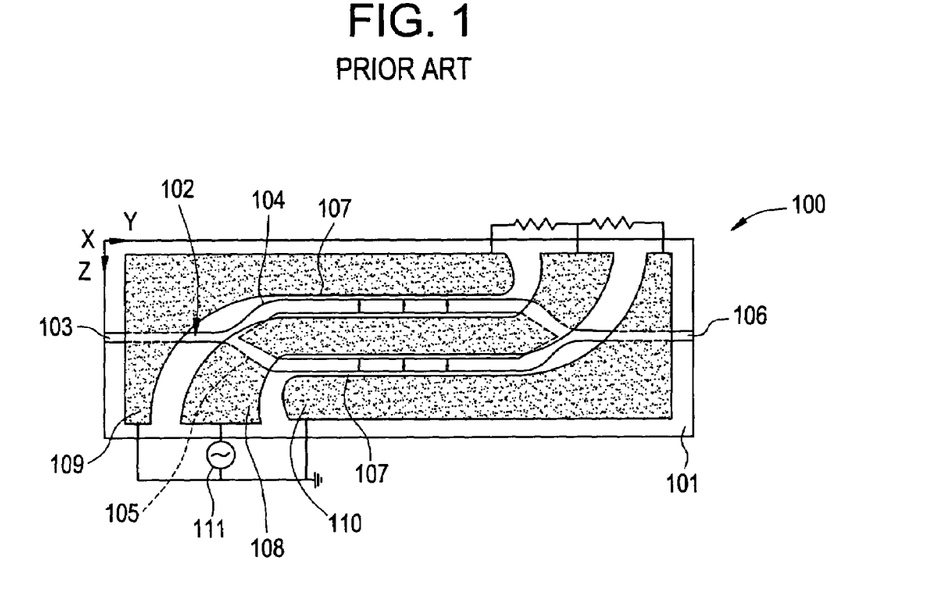
FIG. 1 depicts a schematic diagram of a conventional intensity modulator including a Coplanar Waveguide (CPW) electrode structure of a push-pull configuration.

Electro-optic chip 101 as shown in FIG. 1, is typically a lithium niobate chip. The typical optical waveguide structure of a modulator is formed in a lithium niobate substrate by thermally diffusing titanium into the substrate or by ion (proton) exchange.

In the optical waveguide structure of a modulator, and as shown in FIG. 1, a Mach-Zehnder interferometer (MZI) 102 is typically disposed. A Mach-Zehnder modulator includes an interferometer 102 having an input waveguide 103 and arms 104, 105 that branch from the input waveguide 103, and an output waveguide 106 at the junction of the arms 104, 105. Typically, an optical signal is directed into and propagates in the input waveguide 103, and is split between the arms 104, 105 so that approximately one-half of the input optical signal propagates in each of the interferometer arms 104, 105. A modulating signal is applied to the modulator in order to change the effective refractive indices of the interferometer arms and to introduce a relative phase shift between the two optical signals. The phase-shifted optical signals combine at the output waveguide 106 and produce intensity modulation. Depending on the relative phase shift between the two optical signals, they may interfere either constructively or destructively. The output of the modulator is thus, an intensity modulated optical signal. A relative phase-shift between the optical signals in the arms 104, 105 of approximately $\pi$ is required to switch the output of the modulator between adjacent on and off states.

The electrode structure shown in FIG. 1 is a microwave Coplanar Waveguide (CPW) aligned with respect to the waveguide structure in such a way that the interferometer arms 104, 105 are positioned in the electrode gaps 107 and run alongside the gap edges (in X-cut devices). A CPW electrode structure includes a hot central (signal) electrode 108 and two ground planes or electrodes 109, 110 formed on opposite sides of the central electrode 108. Microwave (modulating) signals are provided to the signal electrode 108 from a microwave source 111, via a connector and a microwave cable. The widths of the gap 107 and hot electrode 108 are tapered at the input and output. Advantageously, a CPW structure with properly chosen widths of the gap 107 and hot electrode 108 at the modulator input has a microwave field distribution closely matching that of a coaxial cable connecting the modulator to the microwave source 111.

FIG. 1 shows an intensity modulator 100 with the so-called "push-pull" configuration, wherein the electric field crossing one interferometer arm 104 is opposite to that crossing the other 105. As such, the electro-optic phase shifts induced in the two arms 104, 105 are of equal magnitude but opposite sign. Effectively, the intensity modulator 100 incorporates two phase modulators, represented by the two arms 104, 105, which are driven 180 degrees out of phase with respect to each other. The outputs of the two phase modulators are combined to result in an intensity modulation that depends on the relative phase difference between the arms 104, 105. In the push-pull configuration, the phase difference doubles compared to the phase shift in each arm and the half-wave voltage of the modulator is therefore halved, which represents a significant advantage over other schemes.

The main factors limiting the performance of traveling-wave modulators as that shown in FIG. 1, are RF loss of the CPW electrode and the velocity mismatch between the optical waveguide mode and the microwave CPW mode. There has been a significant amount of research and development effort directed at further improvement of traveling-wave modulators, specifically, at the minimization of the RF power required for a given level of optical modulation depth at a certain microwave frequency. Optimization of performance is typically attempted by varying the parameters that define the modulator cross-section, namely the hot electrode width, inter-electrode gap size, and the thickness of the electrode and buffer layer. This task is complicated and the degree of improvement is limited by the numerous trade-offs that relate the cross-section parameters to various performance characteristics. For example, a lower drive voltage can be achieved at low frequencies by thinning the buffer layer and narrowing the gap, but an increased velocity mismatch and lower line impedance will cause the bandwidth and microwave return loss to decrease.

Figure 2:
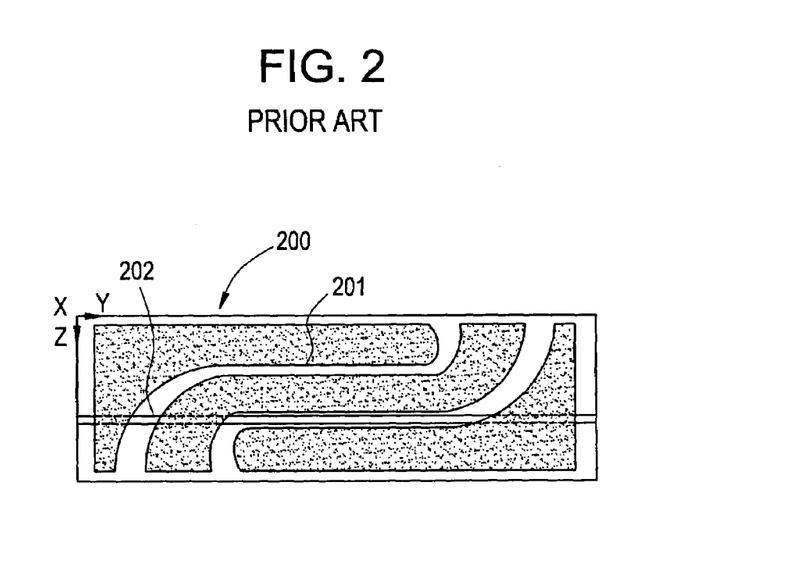
FIG. 2 depicts a schematic diagram of a conventional phase modulator including a CPW electrode structure.

In many applications, a phase, rather than intensity, modulator is required. As seen in FIG. 2, in this case a modulator with a CPW structure 200 cannot provide a push-pull configuration, and exactly one half of the total RF power launched into the CPW electrode is lost in the gap 201 not used by the waveguide 202. As a result, the phase modulator 200 has twice the half-wave voltage of the corresponding push-pull MZI 100.

Figure 3:
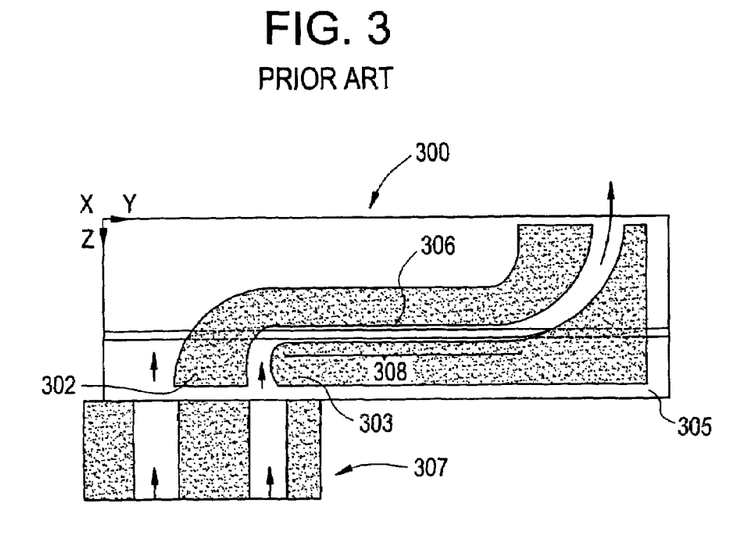
FIG. 3 depicts a schematic diagram of a conventional phase modulator including a coplanar strip (CPS) electrode structure.

The coplanar strip (CPS) structure shown in FIG. 3 may be a better choice for a phase modulator 300 because its higher impedance is close to the coaxial feed line from an RF source 307 (typically 50 Ohm). The coplanar strip (CPS) electrode structure 300 includes a hot electrode 302 to which a modulating signal is applied, and a single ground plane or grounded electrode 303 on one side of the hot electrode 302.

Compared to the CPW electrode described above, the CPS structure has higher impedance for a given ratio of the hot electrode 302 width to the gap 306 width. As such, better impedance matching between the 50 Ohm feed line from the RF source 307 and the CPS electrode can be accomplished, resulting in lower microwave reflection and more microwave power reaching the electro-optic interaction length 308 and thus producing more optical modulation for a given level of the input microwave power level. Furthermore, the CPS structure by itself is known to typically have a better electro-optic overlap integral, and thus a lower drive voltage, than the CPW electrode.

However, the electric field distribution of a CPS line is rather mismatched from that of the feed line. This circumstance limits RF coupling efficiency, causes some fraction of RF power to be launched into the modulator chip 305 in the form of substrate modes, and eventually increases driving voltage and RF reflection.

On balance, it can be seen than the CPW structure is better suited for coupling in and out of a coaxial cable, while the CPS structure is better suited for electro-optic modulation. Accordingly, a technique of improving the optical modulation efficiency and minimizing microwave reflection of guided-wave modulators that could combine the benefits of the CPW or CPS electrode structure types, while avoiding the drawbacks associated with each type, is highly desired.

SUMMARY OF THE INVENTION

The present invention relates to an optical modulator which improves the optical modulation efficiency and minimizes microwave reflection of guided wave modulators.

The optical modulator according to one embodiment of the present invention, includes an optical waveguide; and at least one coplanar-waveguide (CPW) to coplanar-strip (CPS) transition including a CPS segment connected to a CPW segment. Each of the CPW segments includes a hot electrode and a ground plane disposed on each side of the hot electrode. One ground plane is shared between the CPW segments. The CPS segment extends along an interaction length of the modulator and imparts electro-optic modulation to said optical waveguide.

The use of coplanar-waveguide (CPW) to coplanar-strip (CPS) electrode transitions improves the optical modulation efficiency of guided-wave modulators, and lowers the radio frequency (RF) power levels required to drive them. The CPW-to-CPS electrode transitions also ensure that there is no spurious coupling into higher-order parasitic modes in the modulator chip, thus enhancing the operating bandwidth of the device. Furthermore, the use of CPS segments in the electrode increases its impedance and thereby lowers microwave reflection.

In another embodiment consistent with the present invention, the optical modulator includes plural CPW/CPS transitions. Two driving signals can be applied to input microwave ports of the optical modulator so that the modulator operates as a dual-drive modulator. When the driving signals are of equal magnitude and of identical polarity, a pure intensity push-pull operation is enabled. When the driving signals are of equal magnitude and of opposing polarity, a pure phase modulation is enabled. Further, an output of the modulator can be chirped, such that it contains both intensity and phase modulation.

In yet another embodiment consistent with the present invention, the optical modulator is a dual-drive modulator which operates as one of an exclusive OR (XOR) and an exclusive NOR (XNOR) logic gate.

In yet another embodiment consistent with the present invention, the dual-drive optical modulator includes a Mach-Zehnder Interferometer (MZI) as an optical waveguide, and a domain-inverted region is formed in a substrate of the modulator to overlap with one arm of the MZI and invert a sign of a phase shift induced in that arm. The dual-drive modulator can be one of an in-phase modulator and an out-of-phase modulator.

In yet another embodiment consistent with the present invention, a fixed chirp can be introduced into the dual-drive modulator by asymmetrically positioning the interferometer arms in the gaps of the CPS segments with respect to the hot electrodes.

In yet another embodiment consistent with the present invention, a fixed chirp can be introduced into the dual-drive modulator by employing unequal width gaps in the CPS segments.

Finally, in yet another embodiment consistent with the present invention, an optical modulator includes an optical waveguide; and means for providing a current path between two ground coplanar-waveguide (CPW) planes and a ground plane of a coplanar-strip (CPS) segment such that ground potentials are neutralized at any frequency.

There has thus been outlined, some features consistent with the present invention in order that the detailed description thereof that follows may be better understood, and in order that the present contribution to the art may be better appreciated. There are, of course, additional features consistent with the present invention that will be described below and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the methods and apparatuses consistent with the present invention.

DETAILED DESCRIPTION OF THE INVENTION

The present invention includes modulator schemes that combine the benefits of the CPW or CPS electrode structure types, yet avoids the deficiencies associated with each type. As a result, efficient optical modulation can be achieved with a broad operating bandwidth and low microwave reflection.

According to one embodiment consistent with the present invention, a CPW/CPS transition, known in microwave techniques, is applied to optical waveguide modulators to improve the performance of standard electro-optic phase and intensity modulators and to create novel, otherwise previously impossible, modulator designs.

In the area of microwave engineering, a wide variety of possible microwave waveguide structures have been proposed, analyzed in the electrical domain, and developed with a view towards their use in microwave transmission lines. In this regard, the slot, strip, CPS, and CPW structure are among the most common microwave waveguide topologies. Naturally, transitions between various microwave topologies, including the CPW/CPS transition, have been studied, as part of the general microwave theory, to address the issues of impedance and mode matching/transformation, radiation loss, etc. In this regard, it is important to note that while conventionally, focus has been on optimizing the performance of CPW/CPS transitions only in the electrical (microwave) domain, the present invention introduces their use in the optical domain, both for existing optical applications and in novel devices.

Figure 4:
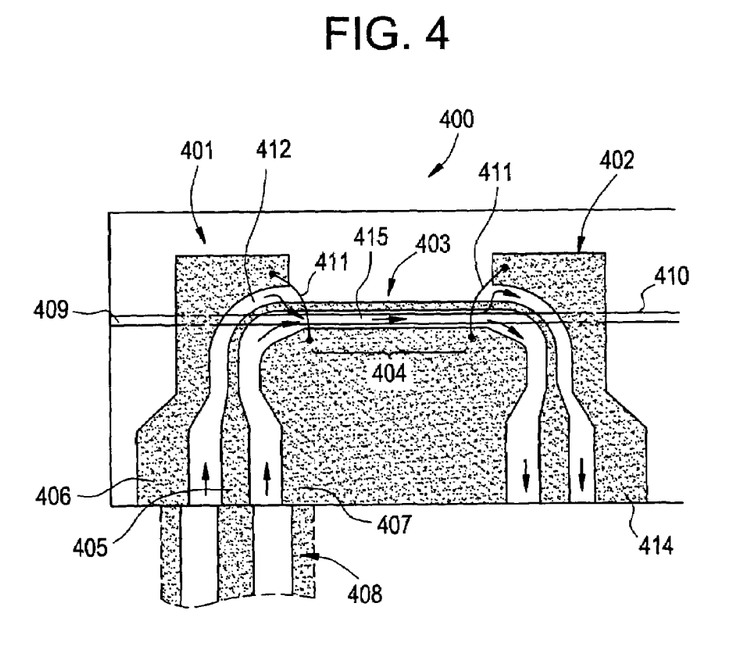
FIG. 4 depicts a schematic diagram of an exemplary optical (phase) modulator including a CPW/CPS transition according to one embodiment consistent with the present invention.

FIG. 4 illustrates one embodiment of the present invention, which is an optical (phase) modulator 400, including a channel optical waveguide 409 and two CPW segments 401, 402. The CPW segments provide mode symmetry when RF is coupled into and out of the electrode structure. The RF traverses a (i.e., asymmetric) CPS line segment 403, which extends along the interaction length 404 of the modulator 400, and imparts electro-optic modulation to the optical waveguide 409. Each CPW segment 401, 402 includes a hot central (signal) electrode 405 and two ground planes or electrodes 406, 407, 414 formed on opposite sides of the central electrode 405. Bonding wires 411 are used to connect ground plane 407 with ground planes 406, 414 of CPW sections 401, 402 at their interfaces with CPS section 403. This is done, in accordance with the principles of microwave theory, in order to provide current paths from/to the two ground CPW planes 406, 414 to/from the single ground plane 407 of the CPS section and to ensure, in terms of electro-magnetic wave distributions, efficient transformation of the CPW microwave mode to that of the CPS, and vice versa.

The phase modulator according to one embodiment of the present invention, as shown in FIG. 4, includes advantages previously achieved individually with CPW and CPS structures. Indeed, the CPW segments 401, 402 ensure efficient coupling to an input coaxial cable 408 and a termination circuitry, if any (not shown in FIG. 4).

According to microwave theory, good overlap between the microwave field distribution of a coaxial cable and that of a CPW can be achieved, by a proper choice of the gap and hot electrode width of the CPW segment, which results in efficient electromagnetic coupling. At the same time, the CPS segment 403 can provide efficient modulation through good electro-optical overlap and be made to have impedance close to that of the feed line 408, by a proper choice of the gap 415 and hot electrode 405 width of the CPS segment.

Furthermore, efficient conversion of the RF power from the gap 412 not used for modulation to the other, can be achieved by employing bond wires (air bridges) 411 at the CPW/CPS transitions, as described above. For optimum operation, the gaps 412, 415 and hot electrode 405 widths of the CPS and CPW segments should be designed to provide good impedance and mode matching between them. As an example, the hot electrode widths for the CPW and CPS segments can be chosen to be continuous across the transition, as shown in FIG. 4. In this case, CPW gap 412 should be made wider than CPS gap 415, since if they were equal, the CPW segments 401, 402 would have a lower impedance than the CPS segment 403, causing an impedance discontinuity at the transitions and microwave reflection. If the difference between gaps 412 and 415 is significant enough to cause microwave mode mismatch and radiation loss, chamfered transitions can be employed, as is well known and detailed in microwave techniques. If the CPW/CPS transition is optimized, following these rules, the conversion efficiency is known to exceed 90%.

Experimental data in the literature on microwave devices and techniques have shown that CPW/CPS transitions can be made to have loss as low as 0.5 dB and reflection down to −15 dB at frequencies up to 10 GHz. In this regard, it is important to note that all previous work has focused on optimizing the performance of CPW/CPS transitions only in the electrical (microwave) domain, while the present invention introduces their use in the optical domain, both for existing optical applications and in novel devices.

Figure 5:
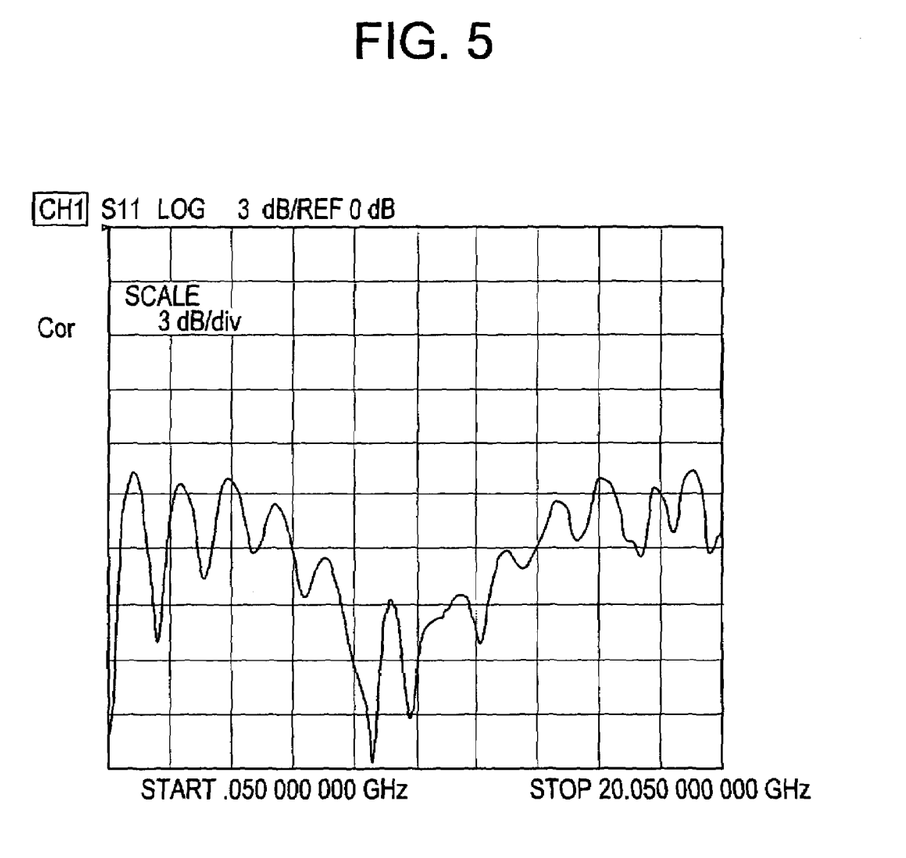
FIG. 5 graphs microwave reflection s11 vs. frequency for a test phase modulator with a composite CPW/CPS electrode, according to one embodiment consistent with the present invention, showing return loss and reflection data.

Experiments performed on the present configuration modulator structures 400 with CPW/CPS transitions, confirmed that the CPW/CPS transitions had low RF loss and reflection. As an example, FIG. 5 shows s11 data taken, with an HP 8510C network analyzer, on a Ti-indiffused X-cut LiNbO3 phase modulator and demonstrates that the return loss is better than 13 dB up to 20 GHz.

In another embodiment consistent with the present invention, dual-drive modulators, which use two independent modulating signals, are used.

Figure 6:
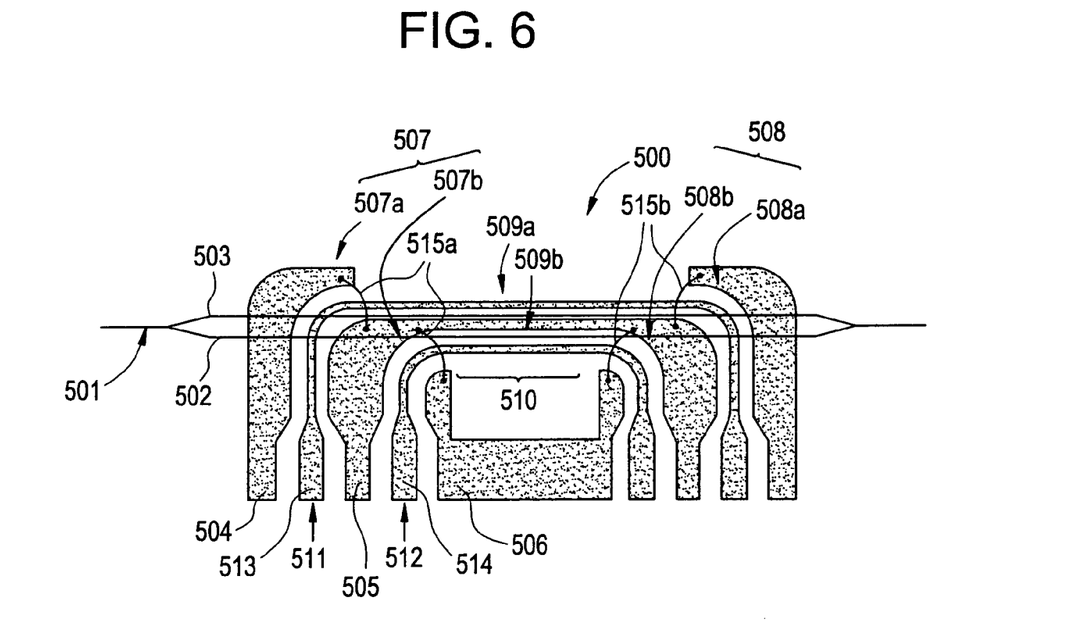
FIG. 6 depicts a schematic diagram of an exemplary dual-drive intensity modulator including CPW/CPS transitions according to another embodiment consistent with the present invention.

FIG. 6 shows a dual-drive modulator 500, typically including an optical waveguide or MZI 501, wherein each of the interferometer arms 502, 503 represents a phase modulator driven by a composite CPW/CPS electrode. The composite CPW/CPS electrode for the interferometer arm 503 (502) includes CPW segments 507a, 508a (507b, 508b), which are subsequently converted into a CPS line 509a (509b), which extends along the entire interaction length 510 of the modulator 500 and effects electro-optic modulation. The two composite CPW/CPS electrodes share ground plane 505, which is a common ground plane for the two overlapping CPW sections 507a, 507b at the input and the two overlapping CPW sections 508a, 508b at the output. Ground plane 505 is also a common ground plane for CPS sections 509a, 509b. As seen, the dual-drive modulator structure 500 is produced by merging two CPWs 507a, 507b at the input and two CPWs 508a, 508b at the output so that the inner ground planes overlap to give one common ground plane 505. Similarly to the arrangement in FIG. 4, bonding wires 515a, 515b are used to connect all ground planes in order to provide current paths between the ground planes of the CPW and CPS sections and ensure, in terms of electromagnetic wave distributions, efficient transformation of the CPW microwave mode to that of the CPS.

Compared to a conventional dual-drive modulator, which uses two separate CPW electrodes, the modulator in FIG. 6 has several advantages. First, the modulator 500 employs a simplified folded electrode topology with a reduced number of electrodes, which reduces the risk of possible structural defects and thus should result in better yields for a given fabrication process. Second, the impedance of the modulator 500 can be made closer to the 50 Ohm of the feed line, since high-impedance CPS sections are used. Furthermore, the CPS sections 509a, 510b also ensure more efficient (compared with a CPW electrode) electro-optic interaction and therefore reduce the required driving voltage/power.

For a modulator 500 with equal CPS gaps and symmetrically positioned waveguides, a pure intensity push-pull operation is enabled by applying two driving signals 511, 512 of equal magnitude and identical polarity to the two input microwave ports defined by hot electrodes 513, 514. Alternatively, the intensity modulator 500 can be driven by two signals 511, 512, of equal magnitude but opposite polarity, to effect phase changes of equal sign in the two interferometer arms 502, 503. In this case, the modulator 500 operates as a phase modulator (i.e., push-push or pull-pull operation). In a general case, when two driving signals of unequal magnitude and arbitrary polarity are applied, the modulator's output contains both intensity and phase modulation, which means that the modulated optical output is chirped.

Overall, the optical output of the modulator 500 for various combinations of two driving signals can be directly calculated and summarized in switching tables. This way, it can be proven that by appropriately biasing the modulator 500 for either minimum ($\pi$ radians) or maximum (0 radians) transmission, the device 500 can be made to operate as an exclusive OR (XOR) or exclusive NOR (XNOR) logic gate in conformance with truth tables 1 and 2.

TABLE 1

| XOR Operation | | |
|---|---|---|
| IN1 | IN2 | OUT |
| 0 | 0 | 0 |
| 0 | 1 | 1 |
| 1 | 0 | 1 |
| 1 | 1 | 0 |

TABLE 2

| XNOR Operation | | |
|---|---|---|
| IN1 | IN2 | OUT |
| 0 | 0 | 1 |
| 0 | 1 | 0 |
| 1 | 0 | 0 |
| 1 | 1 | 1 |

In the tables, IN1 and IN2 are the applied electrical signals (see reference numerals 511, 512) applied to the two inputs of the dual-drive modulator 500 and OUT is the resulting optical output. An input of "0" or "1" is defined as the voltage required to obtain a phase shift of "$+\pi$" or "$-\pi$" in one branch. An output of "0" corresponds to minimum optical transmission, and an output of 1 corresponds to maximum optical transmission.

Figure 7:
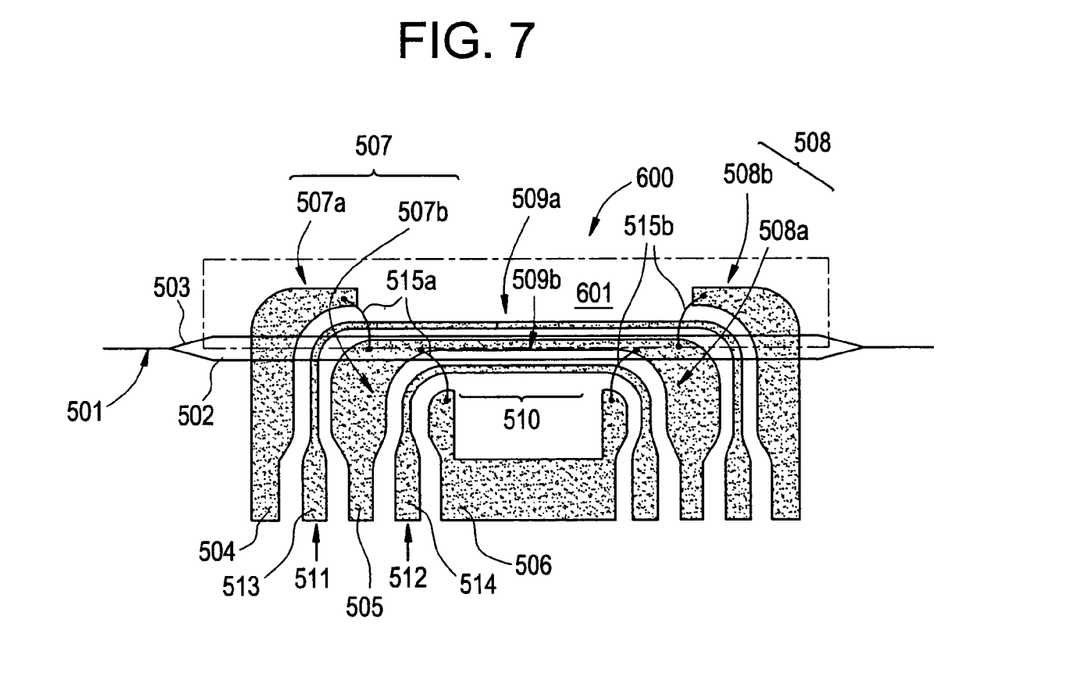
FIG. 7 depicts a schematic diagram of an exemplary dual-drive intensity modulator including CPW/CPS transitions and a domain-inverted region, according to yet another embodiment consistent with the present invention.

In yet another embodiment consistent with the present invention, where like reference numerals refer to like structures, an intensity modulator 600 is realized by employing the electrode structure of FIG. 6 in conjunction with a domain-inverted region 601 formed in the substrate, as shown in FIG. 7. The domain-inverted region 601 overlaps with only one interferometer arm 503 and inverts the sign of the phase shift induced in that arm 503, and thereby enables a push-pull operation for two modulating signals of opposite polarity. Indeed, the direction of the electric field in both gaps over the interaction section 510 is the same, so that without the domain region 601, phase shifts of the same sign would be induced. The domain region 601 inverts the sign of the phase shift induced in arm 503 and makes it out of phase with the phase shift induced in arm 502. The differential phase shift between the two arms 502, 503 is therefore, increased. If the phase shifts in the individual arms are equal in magnitude, then the differential phase shifts doubles. As seen, modulators 500 and 600 are complementary in terms of polarity requirements for the push-pull operation, in the sense that modulator 500 requires identical polarity for the two modulating signals, while modulator 600 requires opposite polarity.

Practical drivers for dual-drive modulators have dual electrical outputs that are either in-phase or out-of-phase. Modulators 500 and 600 can be used for in-phase and out-of-phase dual-drive modulators, respectively, thus providing extra flexibility in choosing an optimum modulator driver for a specific practical application.

Finally, dual-drive modulators 500, 600 with CPW/CPS transitions, such as those illustrated in FIGS. 6 and 7, provide design flexibility that can be used to enhance electro-optic efficiency without compromising extinction ratio. It is well known that the relative position of a waveguide with respect to an electrode determines the electro-optical overlap integral and consequently electro-optic efficiency. The latter can be optimized by properly offsetting the waveguide with respect to the electrode, which in X-cut (other crystal cuts, such as Z-cut LiNbO3, and other materials can be considered) typically requires the waveguide to be positioned close to the hot electrode. In a modulator with a CPW electrode, such optimization is limited by a relatively narrow hot electrode. In this case, highest modulation efficiency (lowest drive voltage) would require the interferometer arms to be very close to each other, which could cause optical interaction (coupling) between them and degrade extinction ratio.

As opposed to modulators with standard CPW electrodes, in modulators 500 and 600 each interferometer arm 502, 503 can be positioned in the corresponding gap 516 independently of the other, since the common ground plane 505 is wide. Thus, the maximum electro-optic efficiency can be achieved for each interferometer arm, resulting in the lowest drive voltage for the modulator, without the aforementioned trade-off between the drive voltage and extinction ratio.

Figure 8:
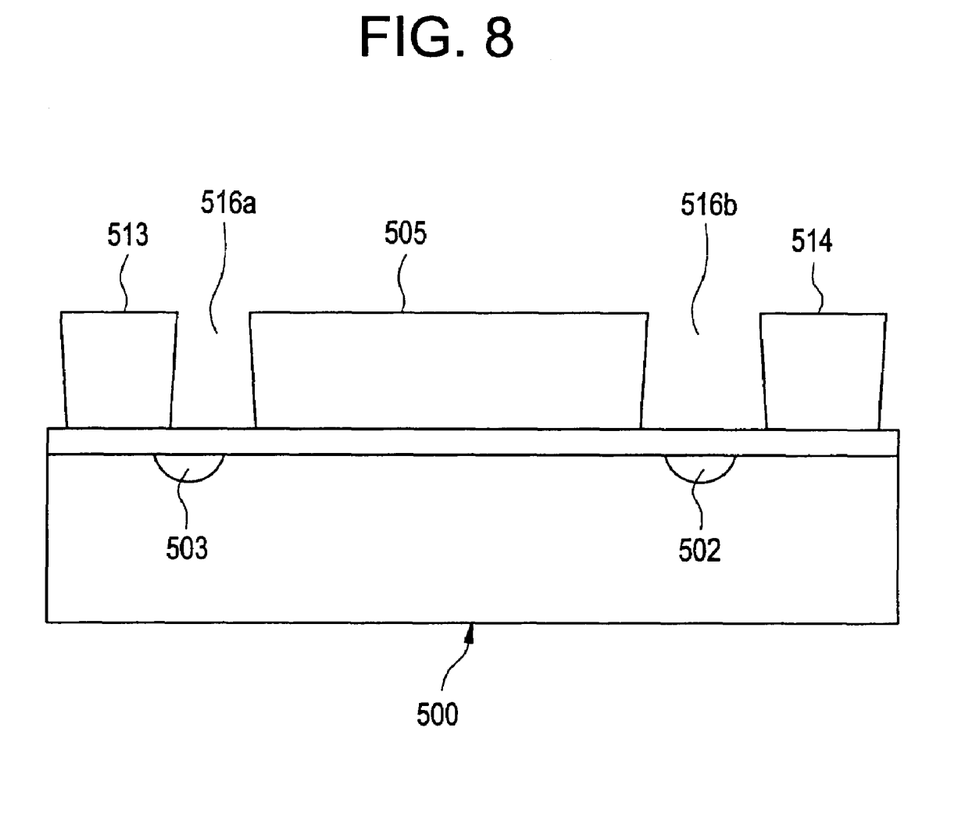
FIG. 8 depicts the cross-section of the interaction length of an exemplary intensity modulator with a CPW/CPS electrode wherein unequal waveguide offsets and electrode gaps are implemented, according to one embodiment consistent with the present invention.

Furthermore, as illustrated in FIG. 8, where like numerals refer to like structures, a fixed chirp can be introduced in the modulator (see reference numerals 500, 600 in FIGS. 6 and 7, for example) by varying the degree of waveguide offset, for example, by asymmetrically positioning the waveguide arms 502, 503 in the two gaps 516a, 516b with respect to the active electrode, and/or by employing unequal-width electrode gaps 516a, 516b. Besides, interferometer arms of unequal mode distributions and/or bends in the electrodes or arms can be employed in order to reduce or eliminate electro-optic interaction over some fragments of the interaction length 510. In all these cases, unequal modulation efficiencies for the two interferometer arms 502, 503 will cause both a phase and intensity modulation at the modulator output, i.e., chirp. The latter is typically used to mitigate the impact of fiber chromatic dispersion, which causes optical pulses to spread and limits data transmission rates. If a modulator with a fixed chirp is positioned after a CW optical source, the modulator can both produce and pre-chirp optical pulses before sending them into a fiber-optic transmission link. As the pre-chirped pulses propagate through the fiber link, they first are compressed and later on begin to spread, but only after having reached a certain minimum width. By properly choosing the amount of chirp, the effect of fiber dispersion can be compensated to a desired degree.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. An optical modulator comprising:
   an optical wavaguide; and
   at least one coplanar-waveguide (CPW) to coplanar-strip (CPS) transition including:
   a CPW segment connected to a CPS segment;
   wherein one ground plane is shared between each said at least one CPW segment.

2. The optical modulator of claim 1, wherein said CPW is used for coupling the modulating RF signal at least one of in and out of the modulator.

3. The optical modulator of claim 1, wherein each of said at least one CPW segment comprises:
   a hot electrode; and
   a ground plane disposed on each side of said hot electrode.

4. The optical modulator of claim 1, wherein the modulator is an intensity modulator.

5. The optical modulator of claim 1, wherein said CPS segment extends along an interaction length of the modulator wherein electro-optic modulation is imparted to said optical waveguide.

6. The optical modulator of claim 1, wherein each said at last one CPW segment is disposed at each end of said CPS segment, and said CPS segment couples each said CPW segment together.

7. The optical modulator of claim 1, wherein said optical waveguide includes a Mach-Zehnder Interferometer (MZI).

8. The optical modulator of claim 7, wherein said MZI includes a plurality of arms, each of said arms representing a phase modulator driven by a composite CPW/CPS electrode.

9. An optical modulator comprising:
   an optical waveguide;
   at least one coplanar-waveguide (CPW) to coplanar-strip (CPS) transition including:
   a CPW segment connected to a CPS segment;
   wherein a width of said hot electrode is continuous across said CPW/CPS transition.

10. An optical modulator comprising:
    an optical waveguide;
    at least one coplanar-waveguide (CPW) to coplanar-strip (CPS)) transition including:
    a CPW segment connected to a CPS segment;
    wherein a gap of each of said CPW segments is wider than a gap of said CPS segment.

11. A phase modulator comprising:
    an optical waveguide;
    at least one coplanar-waveguide (CPW) to coplanar-strip (CPS) transition including:
    a CPW segment connected to a CPS segment;
    wherein an impedance of said CPS segment is substantially that of an impedance of a coaxial cable feed line.

12. An optical modulator comprising:
    an optical waveguide;
    at least one coplanar-waveguide (CPW) to coplanar-strip (CPS) transition including:
    a CPW segment connected to a CPS segment;
    wherein the modulator is a phase modulator.

13. The optical modulator of claim 12, wherein said optical waveguide is a single channel waveguide.

14. The optical modulator comprising:
    an optical waveguide;
    at least one coplanar-waveguide (CPW) to coplanar-strip (CPS) transition including:
    a CPW segment connected to a CPS segment;
    a hot electrode; and
    a ground plane disposed on each side of said hot electrode; and
    means for connecting each said ground plane in each said at least one CPW segment.

15. The optical modulator of claim 7, wherein said connecting means are bonding wires which connect each said ground plane of each said at least one CPW segment at interfaces with each said at least one CPS segment.

16. An optical modulator comprising:
    an optical waveguide;
    at least one coplanar-waveguide (CPW) to coplanar-strip (CPS) transition including:
    a CPW segment connected to a CPS segment;
    wherein said CPW is used for coupling the modulating RF signal at least one of in and out of the modulator:
    wherein said at least one CPW/CPS transition is plural in number, and each of said CPS segments of said CPW/CPS transitions, connects to CPW segments.

17. The optical modulator of claim 16, wherein each of said CPS segments extends along an interaction length of the modulator and imparts electro-optic modulation to said optical waveguide.

18. The optical modulator of claim 16, wherein one of said plural CPW/CPS transitions shares a common ground plane with another one of said CPW/CPS transitions.

19. The optical modulator of claim 16, wherein said CPW segments are disposed at both ends of said CPS segment, and said CPS segment couples said CPW segments together.

20. The optical modulator of claim 16, further comprising: means for connecting said ground planes in said CPW segments.

21. The optical modulator of claim 20, wherein said connecting means are bonding wires which connect said ground planes of said CPW segments at interfaces with said CPS segment.

22. The optical modulator of claim 9, wherein at least one of unequal mode distributions of said arms and bends in one of said CPW/CPS transitions and arms are provided.

23. The optical modulator of claim 16, wherein two driving signals are applied to input microwave ports and the modulator operates as a dual-drive modulator.

24. The optical modulator of claim 23, wherein said driving signals are of equal magnitude and of identical polarity to enable a pure intensity push-pull operation.

25. The optical modulator of claim 24, wherein said driving signals are of equal magnitude and of opposite polarity to enable a pure phase modulation.

26. The optical modulator of claim 23, wherein an output of the modulator is chirped and contains both intensity and phase modulation.

27. The optical-modulator of claim 23, wherein said dual-drive modulator operates as one of an exclusive OR (XOR) and an exclusive NOR (XNOR) logic gate.

28. The optical modulator of claim 23, wherein said optical waveguide is a Mach Zehnder Interferometer (MZI), said MZI which includes a plurality of arms, each of said arms representing a phase modulator driven by a composite CPW/CPS electrode.

29. The optical modulator of claim 28, wherein a domain-inverted region is formed in a substrate of said dual-drive modulator to overlap with one arm of said MZI and invert a sign of a phase shift induced in that arm.

30. The optical modulator of claim 28, wherein each interferometer arm can be positioned in a corresponding gap in said CPW segment independently of the other.

31. The optical modulator of claim 23, wherein said dual-drive modulator is one of an in-phase modulator and art out-of-phase modulator.

32. The optical modulator of claim 23, wherein a fixed chirp can be introduced into said dual-drive modulator by asymmetrically positioning said interferometer arms into gaps of said CPW segments with respect to said hot electrode.

33. The optical modulator of claim 23, wherein a fixed chirp can be introduced into said dual-drive modulator by employing unequal width gaps in said CPW segments.

34. An optical modulator comprising: an optical waveguide; and means for connecting ground planes of a plurality of coplanar-waveguide (CPW) segments and a ground plane of a coplanar-strip (CPS) segment such that ground potentials are neutralized at any frequency.

* * * * *